United States Patent
Panat et al.

(10) Patent No.: US 9,846,276 B2
(45) Date of Patent: Dec. 19, 2017

(54) LOW-COST FIBER OPTIC SENSOR FOR LARGE STRAINS

(71) Applicants: Rahul Panat, Pullman, WA (US); Lei Li, Pullman, WA (US)

(72) Inventors: Rahul Panat, Pullman, WA (US); Lei Li, Pullman, WA (US)

(73) Assignee: Washington State University, Pullman, WA (US)

( * ) Notice: Subject to any disclaimer, the term of this patent is extended or adjusted under 35 U.S.C. 154(b) by 0 days.

(21) Appl. No.: 15/098,891

(22) Filed: Apr. 14, 2016

(65) Prior Publication Data

US 2016/0305771 A1    Oct. 20, 2016

Related U.S. Application Data (60) Provisional application No. 62/147,495, filed on Apr. 14, 2015.

(51) Int. Cl.
*G01L 1/24* (2006.01)
*G02B 6/02* (2006.01)
(Continued)

(52) U.S. Cl.
CPC .......... *G02B 6/02142* (2013.01); *G01B 11/18* (2013.01); *G02B 6/021* (2013.01);
(Continued)

(58) Field of Classification Search
CPC ............ G01B 6/01847; G01B 6/02066; G01B 6/02071; G01B 6/02095; G01B 6/021;
(Continued)

(56) References Cited

U.S. PATENT DOCUMENTS 3,891,302 A * 6/1975 Dabby ............... G02B 6/02066
                                                        359/900
5,007,705 A * 4/1991 Morey .................. G02B 6/022
                                                         385/12
(Continued)

OTHER PUBLICATIONS

Crowe et al. "Manipulating Siloxane Surfaces: Obtaining the Desired Surface Function via Engineering Design". Science and Technology of Silicones and Silicone-Modified Materials. Chapter 15, p. 222-255. Aug. 2, 2007. Access [Online] Jan. 7, 2017 <http://pubs.acs.org/doi/pdf/10.1021/bk-2007-0964.ch015>.*

*Primary Examiner* — Jonathan Dunlap
(74) *Attorney, Agent, or Firm* — Whitham, Curtis & Cook, P.C.

(57) ABSTRACT

A fiber grating device of low cost and arbitrary length is formed on a portion of a portion or the entirety of a highly elastic fiber optic core having a low Young's modulus of elasticity by causing elongation of the fiber optic core and forming or depositing a hard skin or cladding on the elongated fiber optic core. When the stress is then released, the hard skin or cladding buckles (including elastic or plastic deformation or both) to form wrinkles at the interface of the fiber optic core and the hard skin or cladding which are oriented circumferentially and highly uniform in height and spacing which can be varied at will by choice of materials, stretching, and thickness and composition of the cladding. Since the elastic elongation of the fiber optic core portion may be 200% or greater, an unprecedented measurement range is provided.

7 Claims, 8 Drawing Sheets

(51) Int. Cl.
*G01B 11/16* (2006.01)
*G02B 5/18* (2006.01)

(52) U.S. Cl.
CPC ..... *G02B 6/02152* (2013.01); *G02B 6/02395* (2013.01); *G02B 5/1847* (2013.01); *G02B 6/0229* (2013.01); *G02B 6/02066* (2013.01); *G02B 6/02071* (2013.01); *G02B 6/02095* (2013.01); *G02B 6/02123* (2013.01); *G02B 2006/02161* (2013.01)

(58) Field of Classification Search
CPC ............ G01B 6/02123; G01B 6/02142; G01B 6/02152; G01B 6/0229; G01B 6/02395; G01B 5/1847; G01B 11/18; G02B 2006/02161
USPC ..... 73/800; 359/566, 569; 385/123, 144, 28, 385/37; 427/163.2
See application file for complete search history.

(56) References Cited

U.S. PATENT DOCUMENTS

| | | | | |
|---|---|---|---|---|
| 5,043,991 | A * | 8/1991 | Bradley | H01S 5/125 372/32 |
| 5,144,690 | A * | 9/1992 | Domash | G01D 5/35383 385/12 |
| 5,411,566 | A * | 5/1995 | Poole | C03B 37/15 385/28 |
| 5,708,740 | A * | 1/1998 | Cullen | G02B 6/02071 385/39 |
| 5,995,697 | A * | 11/1999 | Byron | G02B 6/02104 385/123 |
| 6,408,118 | B1 * | 6/2002 | Ahuja | G02B 6/02 385/123 |
| 6,430,342 | B1 * | 8/2002 | Kim | G02B 6/02071 385/28 |
| 6,832,025 | B2 * | 12/2004 | Fisher | G02B 6/02066 385/27 |
| 6,876,786 | B2 * | 4/2005 | Chliaguine | G01D 5/35303 250/227.11 |
| 7,853,102 | B2 * | 12/2010 | Lee | B29D 11/00663 385/37 |
| 8,634,687 | B2 * | 1/2014 | Sakabe | C03C 25/105 385/123 |
| 8,670,476 | B2 * | 3/2014 | Goddard | G02B 6/12007 372/102 |
| 8,792,169 | B2 * | 7/2014 | Jiang | C23C 14/028 359/566 |
| 2003/0002795 | A1 * | 1/2003 | Fisher | G02B 6/02066 385/37 |
| 2003/0174384 | A1 * | 9/2003 | Halas | C23C 18/1851 359/296 |
| 2004/0105623 | A1 * | 6/2004 | Russell | G02B 5/1857 385/37 |
| 2004/0179800 | A1 * | 9/2004 | Walker, Jr. | C03C 25/101 385/128 |
| 2006/0113279 | A1 * | 6/2006 | Little | G02B 5/3058 216/41 |
| 2008/0085073 | A1 * | 4/2008 | Jones | G01L 1/246 385/12 |
| 2010/0315713 | A1 * | 12/2010 | Walter | G02B 5/1809 359/568 |
| 2012/0063484 | A1 * | 3/2012 | Goddard | G02B 6/12007 372/94 |
| 2012/0212820 | A1 * | 8/2012 | Jiang | C23C 14/028 359/566 |
| 2013/0287355 | A1 * | 10/2013 | Han | G01N 21/554 385/128 |
| 2014/0109965 | A1 * | 4/2014 | Goto | H01L 31/02168 136/259 |
| 2014/0253920 | A1 * | 9/2014 | Sugimoto | G01N 21/554 356/369 |
| 2014/0268310 | A1 * | 9/2014 | Ye | G02B 6/02 359/341.1 |
| 2015/0346102 | A1 * | 12/2015 | Chimenti | G01N 21/65 356/301 |
| 2015/0362669 | A1 * | 12/2015 | Aizenberg | G01L 1/247 385/13 |
| 2016/0116670 | A1 * | 4/2016 | Toyserkani | G01D 5/35316 250/227.18 |
| 2016/0185059 | A1 * | 6/2016 | Kim | G02B 6/02071 425/150 |

* cited by examiner

LOW-COST FIBER OPTIC SENSOR FOR LARGE STRAINS

CROSS-REFERENCE TO RELATED APPLICATIONS

This application claims benefit of priority of U.S. Provisional Application 62/147,495, filed Apr. 14, 2015, which is hereby incorporated by reference in its entirety.

FIELD OF THE INVENTION

The present invention generally relates to fiber optic sensors for measurement of physical parameters and, more particularly, to fiber optic sensors for measurement of physical parameters which involve large levels of strain or large dimensions.

BACKGROUND OF THE INVENTION

Fiber optic sensors have been used for a number of years to make measurements of physical parameters such as pressure, tensile or compressive forces, temperature, flow rate, humidity, refractive index and the like, particularly in hostile environments and long-duration monitoring since the optical properties and behaviors of fiber optic cables and sensors such as Bragg gratings are well-known, the technology of the optics is mature and the optical cables and sensors are particularly robust and resistant to damage or aging in the environments in which they are employed. Further, robust hardware structures can generally be easily adapted to convert the effects of the physical parameter of interest into a physical deformation due to a mechanical force, referred to as strain, that is variable with the physical parameter of interest to change the optical behavior of a portion of fiber optic cable or an optical sensor in a highly predictable manner, allowing measurements to be made at remote and inaccessible locations with a high degree of accuracy.

However, at the present state of the art, the amount of strain that can be used for making measurement is limited by the nature of the materials which can perform as fiber optic cables and sensors. Specifically, the glass or hard plastic materials that have been traditionally used have a large value of their Young's modulus of elasticity (hereinafter sometimes simply "modulus") and very short elongation before fracturing which complicates making measurements involving large magnitudes of strain. Moreover, known methods of making sensors such as Bragg gratings, which are well known and understood and used for optical notch filters, optical multiplexers and demultiplexers or optical add-drop multiplexers, are complicated and expensive as well as resulting in sensors which are better adapted to relatively small strain dimensions. For example, typical (e.g., short period) fiber Bragg grating (FBG) structures have periodic gratings of less than one micron and are typically fabricated by excimer lasers and phase masks. Longer period FBGs have a grating periodicity in the range of 100 microns to 1 millimeter and are fabricated by ultraviolet (UV) radiation, ion implantation, femtosecond infrared (IR) radiation, carbon dioxide laser irradiation or diffusion of dopants into the core of a fiber optic cable which are expensive and complex with often relatively small process parameter windows.

These factors generally limit usable strain ranges to 5% or less of the sensor dimensions while large strain measurements are a critical problem for many applications such as monitoring the structures of aircraft, ships, buildings and other large structures and constructions that are subject to aging, positional shifting, or deformation by applied forces or other conditions of environment and/or use as well as for monitoring any other aspects of structural health. Moreover, the parameters of interest in such measurements may favor measurement over a substantial continuous distance such as for measurement of settling or subsidence or dimensional creep of materials under substantial force for an extended period of time which may require large sensor physical size whereas typical fiber optic sensors are very small and their cost of manufacture is generally proportional to their length. Therefore, fiber optical measurement over significant distances has been limited to measurement of distances between sensors (e.g. forming a Fabry-Perot cavity therebetween); requiring a costly and complicated arrangement that, in turn, requires optical measurements of extremely high precision, such as reflection return time or interference pattern detection and analysis rather than much simpler techniques of measurement of light intensity or spectrum.

SUMMARY OF THE INVENTION

It is therefore an object of the present invention to provide a highly elastic and extensible fiber optic material.

It is another object of the invention to provide a long period grating fiber optic sensor structure that can be made arbitrarily large at low cost but which remains physically robust and of comparable accuracy to much smaller currently typical fiber optic sensors.

It is a further object of the invention to provide a long period grating fiber optic sensor which can measure strains as large as 200% of unstressed sensor length.

In order to accomplish these and other objects of the invention, a fiber grating device is provided comprising an optical fiber core that is extensible by application of stress, and a hard skin or cladding on the optical fiber and forming a wrinkled interface between said hard skin or cladding and the optical fiber core wherein height and periodicity of the wrinkles is altered by axial forces applied to the optical fiber core.

In accordance with another aspect of the invention, a method of forming a fiber Bragg grating device is provided comprising steps of applying an axial force to at least a portion of an elastically deformable fiber optic core to produce an elongation, forming or applying a hard skin or cladding on the fiber optic core while elongated, and releasing the axial force to form circular ring-shaped wrinkles at an interface of said fiber optic core and said hard skin or cladding such that said axial force applied to produce said elongation typically exceeds an axial buckling force threshold of said hard skin or cladding.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
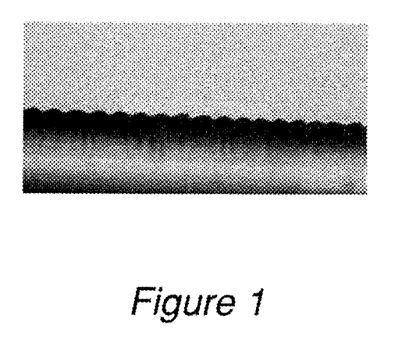
FIG. 1 is a lateral cross-sectional view of a representative length of fiber optic sensor in accordance with the invention.

Referring now to the drawings, and more particularly to FIG. 1, there is shown a portion of a lateral cross-section of a representative length of fiber optic sensor in accordance with the invention. In the portion of the lateral cross-section shown, a portion of a fiber optic core, preferably of polydimethylsiloxane (PDMS), is encased in a hard shell or overlayer (e.g., referred to as a skin or cladding; skin tending to infer a small thickness and cladding inferring a greater thickness approaching one half the unstressed diameter of the core which is considered at the present time to be a practical limit on cladding thickness but is not critical to the useful practice of the invention) that may comprise any of a plurality of materials as will be described below with an undulating surface at the interface of the two materials with the undulations being substantially uniform in both height and period along the fiber length. Since a small amount of manufacturing variability inevitably occurs, height/amplitude and period/frequency of the undulations are regarded as substantially uniform within acceptable tolerances and can be calibrated individually (e.g., theoretically or empirically).

The optical fiber core has a preferably circular cross-section. Alternative embodiments may use optical fiber cores with circular, rectangular, square, or elliptical cross-section, for example. The cross-section may also be any closed conical section or any polygonal shape. The overlayer and wrinkles have an overall cross-sectional shape corresponding with the cross-sectional shape of the fiber optic core.

Figure 2:
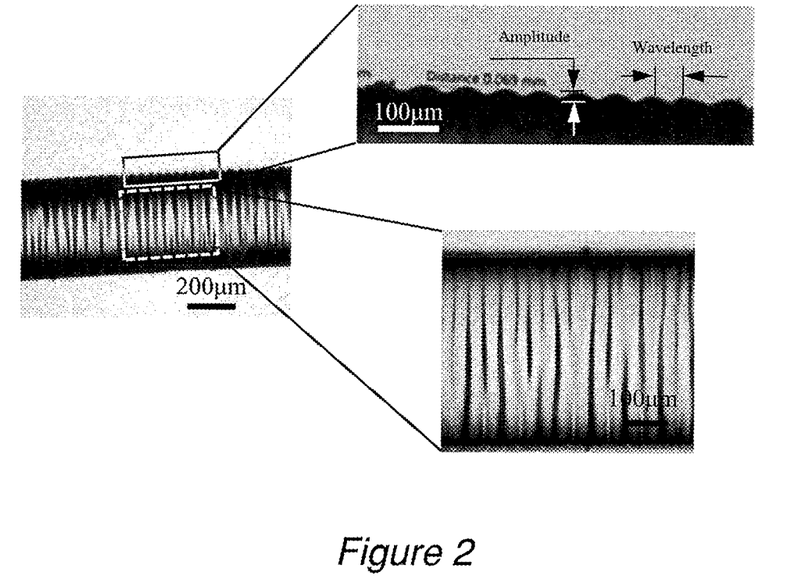
FIG. 2 is a lateral view of a representative length of a fiber grating device with magnified portions.

FIG. 2 shows images of a PDMS fiber grating device after it has been stretched, exposed to UV light, and then released. The optical images of the wrinkled fiber include a lateral view of a portion of fiber grating device with specific sections thereof further magnified. The upper magnified view shows the hard overlayer (e.g., skin or cladding) with indication of wrinkle amplitude and wavelength. The lower magnified view shows how the undulations (as referred to herein as folds, wrinkles, etc.) surround the core circumferentially. The term "hard" in the context of the invention is defined as having a modulus of elasticity at least twice the modulus of elasticity of the core and having finite axial buckling force threshold (which may include fracture or plastic deformation or both) within the level of stress to achieve 200% elongation of the core. If fracture does occur, it is not important to functionality. The fiber core and overlayer structure may be additionally encased in a protective sheath as may or may not be desirable for a given application. Accordingly, the entire length of the undulations can function as a long period grating and the structure is extremely simple and inexpensive to fabricate.

Further, the preferred PDMS core has a low modulus and can withstand a strain elongation of 200% or more to provide an unprecedented range of strain measurement. Embodiments of the invention are useable in applications involving small or large strains. Large strain is definable as anything greater than 1% or 2% strain. In this regard, it should be appreciated that fiber grating devices (e.g., fiber optic sensors) fabricated in accordance with the invention can measure strains to a large fraction of the strain applied to the fiber optic core during manufacture. Thus, for example, if only a 50% elongation of the fiber optic core was applied during manufacture, accurate measurements could be made to well above a 30% elongation yielding an expansion of measurement range by at least an order of magnitude greater than previously possible.

Measurements can be made in several different but simple methods that may be used singly or in combination with more complicated known or foreseeable techniques for more complicated measurement applications since the mechanism for producing the wrinkles is mechanically reproducible and repeatable. Specifically, the wrinkles in the surface of the optical fiber tend to scatter light in a manner similar to known Bragg gratings and thus the level of light (or other energy) transmission, spectral effects and interference patterns will change with height and periodicity of the wrinkles. A non-limiting example of a fiber grating device is a fiber Bragg grating (FBG). A longitudinal stress causing elongation of the sensor in accordance with the invention will cause the wrinkles to be diminished in height and increased in separation, thus changing both the degree of scattering and effects on the spectrum of the light transmitted through the fiber core. Wrinkles of sufficient height for accurate measurements will remain up to a strain level approaching the strain applied where the hard skin or cladding is formed.

Figure 3:
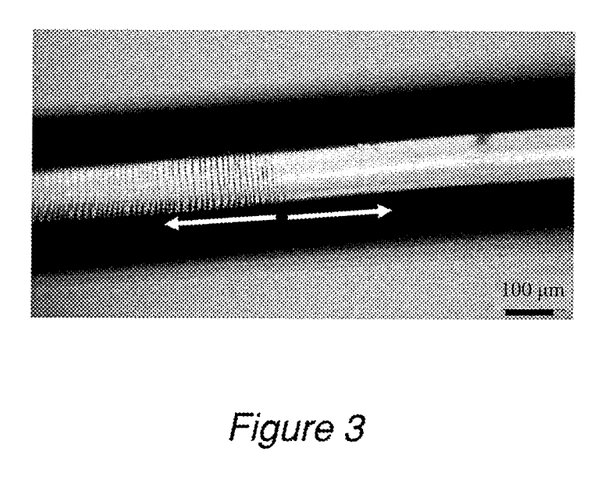
FIG. 3 is a lateral view of a representative optical fiber which has sections with grating and sections without grating.

FIG. 3 is an optical image showing the visible boundary between the length of fiber exposed to UV (corresponding with the arrow pointing left) and an adjacent length of fiber not exposed to UV during the stretched state (corresponding with the arrow pointing right). The wrinkle formation occurs only in the area exposed to UV. Ultraviolet exposure will be discussed in greater detail below in connection with fabrication methods.

Figure 4:
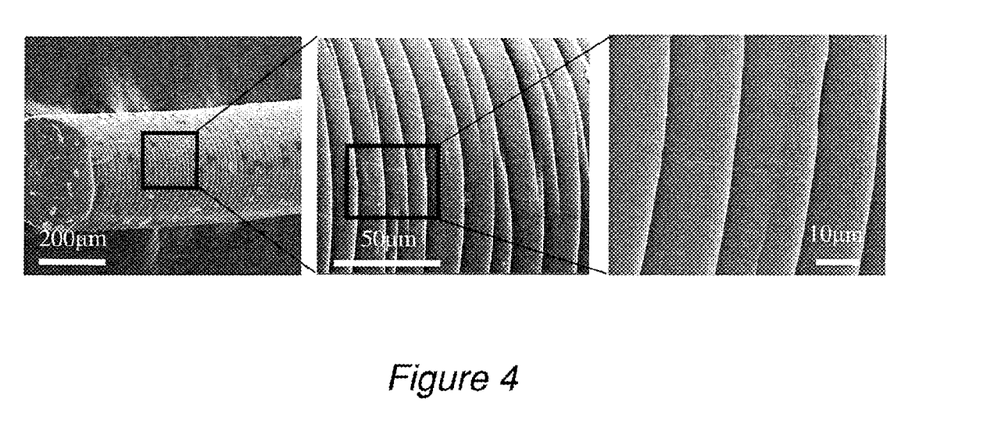
FIG. 4 is a series of scanning electron microscopy (SEM) micrographs of a representative section of a fiber grating device with multiple levels of magnification.

FIG. 4 shows scanning electron microscope (SEM) micrographs of a fiber grating device at different magnifications showing the axisymmetric wrinkle morphology. For the wrinkles in the images of FIGS. 2, 3, and 4, the entire fiber circumference was exposed to the UV light during the wrinkle fabrication.

Figure 5:
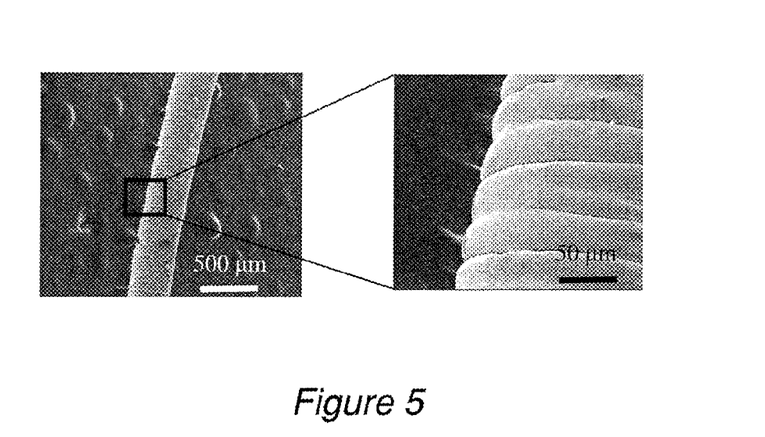
FIG. 5 is a further series of SEM micrographs of a representative length of an optical fiber with grating at different levels of magnification, FIG. 6 illustrate the preferred method of manufacture of the fiber optic sensor of FIG. 1.

FIG. 5 shows SEM micrographs of a fiber at different magnifications showing the wrinkle morphology on one side of the fiber. Only one side of the fiber circumference was exposed to the UV light during the wrinkle fabrication in this case.

Figure 6:
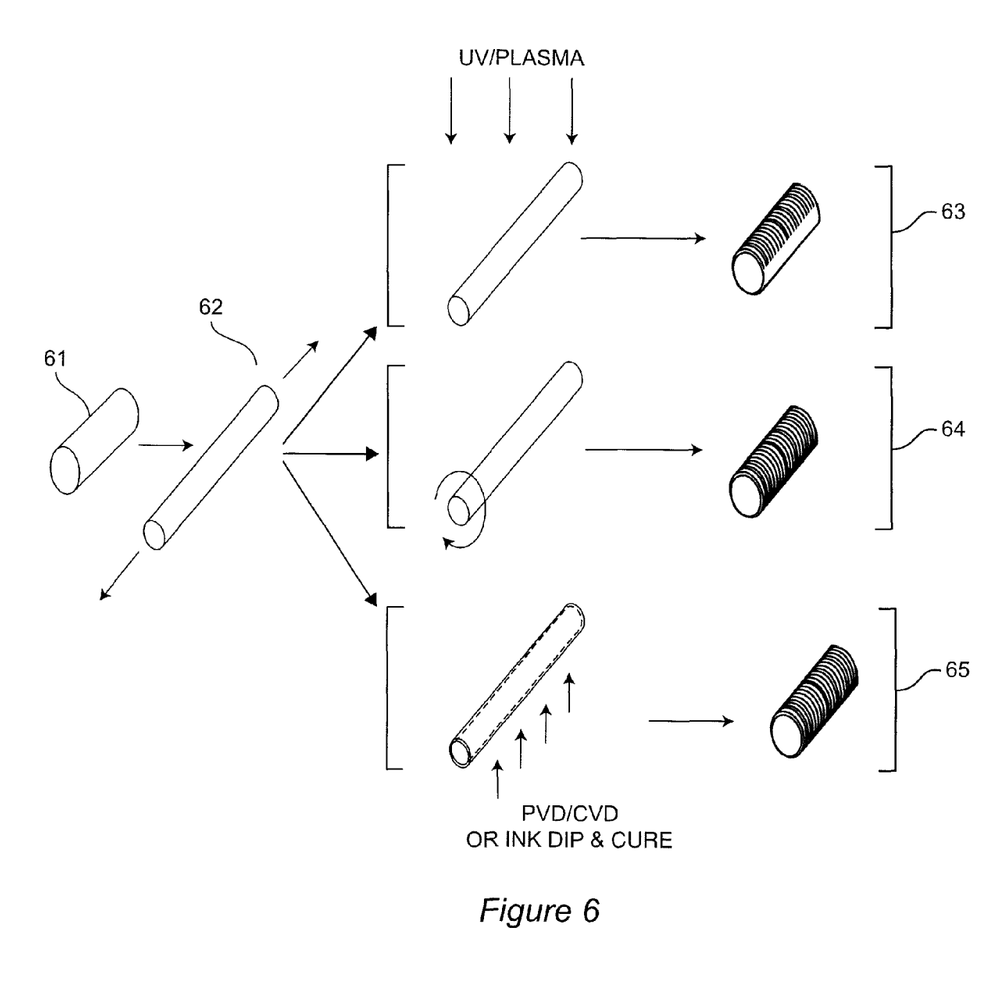

Referring now to FIG. 6, fabrication methods for the structure of FIG. 1 will now be discussed. Essentially, numerous fabrication processes can be used, depending on the preferred materials but all such methods share the same general methodology which is to place a longitudinal or axial stress on the preferably PDMS core 61 to achieve a substantial strain elongation 62 (e.g., about 200% or more), irradiating a portion of the fiber core with Ultraviolet (UV) energy (e.g., UV light having wavelengths of 254 nm and 185 nm for forming a hard skin or cladding from the preferred PDMS material or applying a different material as will be described below) or plasma (e.g., ozone plasma), to a thickness largely dependent on the relation of modulus of elasticity and desired skin or cladding thickness of the hard skin material, and release the stress. The irradiation by UV or plasma indicated in FIG. 6 applies to fabrication methods 63 and 64. Fabrication method 63 involves irradiating less than the entire circumference of the core 61. Fabrication method 64 involves irradiating the entire circumference of the core 61, for example by rotating the stretched fiber core during irradiation. Irradiation with UV energy causes, for example, the silicone polymer to convert to a silica ($SiO_x$, where $0 \leq x \leq 2$) hard skin layer (with consequent evolution of ozone gas) possibly including additional trace materials or a mixture of $SiO_x$ and the original fiber core material (e.g., PDMS). Alternatives to UV or plasma irradiation include physical vapor deposition (PVD) (e.g., evaporation, DC or RF magnetron sputtering) or chemical vapor deposition (CVD) (e.g., atomic layer deposition, ALD) to form the overlayer. Ink dip and cure is a further alternative. PVD, CVD, and ink dip and cure are shown schematically as fabrication methods 65 in FIG. 6.

The skin thickness may, in some embodiments, be as large as up to half the diameter of the core. In such cases the skin is preferably referred to as an overlayer. Diameter of the core divided by the thickness of the skin or cladding is preferably a factor of 2 or more. Exemplary skin thickness are, for example, 5 nm to a few microns (e.g., 3 microns). An exemplary core diameter is 500 nm to 200 microns, for example. These are only example sizes. Other skin thickness and core diameters are possible. A hard material (e.g., a hard skin) is definable as having a difference in factor of Young's modulus of elasticity as compared to a comparatively soft material. This difference factor will generally be a factor of at least 2 or greater.

The contraction of the core material then causes compression and buckling or wrinkling of the hard overlayer at the interface along the fiber periphery. Therefore, there is no need to cut, etch or press periodic surface irregularities into the fiber core or otherwise to form periodic variations in the material composition of the core material as has previously been the case and a source of length-dependent substantial manufacturing cost. Rather, the axisymmetric circular wrinkles are inherently formed in a substantially uniform manner (due to the uniform elongation of the core) and the buckling of the hard skin material to a substantially uniform undulation height resulting from the substantially uniform difference in the modulus of elasticity of the two materials. It should also be appreciated that a similar structure can be formed without initial elongation of the core if the sensor will be placed in service in an application in which substantial axial (and possibly radial) stress will be applied which will compress the core axially such as in high pressure remote telemetry in wells and the like.

More specifically, and without wishing to be held to any particular theory of providing the substantial regularity of the wrinkles, the formation of the sensor in accordance with the invention appears to result from the reaching of equilibrium between forces in the core and the hard skin. When the core is initially elongated by strain, the cross-sectional area becomes smaller but seeks to return to its original cross-sectional area upon the stress causing the strain being released. When the hard skin is applied while the core is strained, it will be substantially stress free and surround a reduced cross sectional area but over the full length of the strained region or entirety of the core. Then, when the stress on the core is released, the core applies compression on the hard skin in the axial direction and a force in the radial direction which resolves into a tensile force in the circumferential direction in the hard skin while supporting the interior of the hard skin and exerting a compressive force on the exterior of the core. Therefore, when these force reach equilibrium, the sensor will be slightly longer and the core will be slightly smaller in diameter than the original dimensions of the portion of the core from which the sensor is formed. It should also be appreciated that different core and hard skin materials will have different static or dynamic (as well as in-phase or out-of-phase) moduli of elasticity, relative dimensions of the core and hard skin and different plastic deformation force thresholds (and possibly even grain structure) and that the wrinkles may be the result of buckling, either plastic or elastic deformation, or any combination thereof causing substantial stresses to usually but not necessarily remain in the grating sensor when the stresses reach equilibrium which, will, in turn, depend on the specific core and hard skin materials chosen as well as on process parameters for producing short period or long period sensors with wrinkles of desired height and periodicity in accordance with the general methodology described above. It is believed that the uniformity of height, spacing, and regular circumferential orientation of the wrinkles is attributable to the inherently precise orientation of forces produced in the sensor when the axial force to produce elongation is released.

It should be noted from FIG. 6 that following the UV exposure illustrated, the manufacturing process continues along either of two paths. As a variant form of the general methodology for manufacturing a fiber optic grating in accordance with the invention, particularly for use as a waveguide, it should be noted that, if required, the UV (or other energy) irradiation noted above can be applied evenly by, for example, rotating the fiber optic core as illustrated in the lower path, or selectively, by for example, holding the fiber optic core stationary or by applying masking and applying the energy selectively (e.g. unidirectionally, as shown in the upper path since wrinkles will be formed only where the energy is applied.

Other variant forms of the invention largely involve different core and hard skin or cladding materials and methods of application of desired materials (which may or may not involve UV or plasma radiation) to the flexible core which, itself, can be comprised of any fiber that can be made of a transparent (at least for the wavelengths of interest, e.g., used in making a measurement) stretchable polymer such as but not limited to the preferred PDMS or platinum-catalyzed silicones (e.g., Ecoflex® rubber). A suitable stretchable polymer need not be transparent to visible light if, for example, infrared wavelengths are used for making measurements with the fiber optic sensor. The hard skin may be a stoichiometric or non-stoichiometric composition of silicon and oxygen material formed by UV or plasma treatment of a silicon polymer. The hard skin may also comprise a metal thin film such as of Au, Cu, Cr, In or the like. Cladding may also be applied but is non-critical as to composition and application processes are well-known to those skilled in the art.

For example, as an alternative to curing a portion of the surface of the core to provide a hard skin, a metallic or ceramic thin film can be applied by physical or chemical vapor deposition prior to release of the stretched core. As another such alternative, such materials can be applied by electroless or electrolytic deposition alternatively or in combination with physical or chemical vapor deposition. As a further alternative, the hard skin may be applied using a dip coating or spray coating of any of a number of nanoparticle inks that can be converted into a hard material by subsequent thermal processing and/or photonic and/or plasma curing and/or UV and/or plasma curing. One or more films of a skin or cladding may be a functionally graded film or material. For example, at different positions within the thickness of the overlayer there may exist different moduli of elasticity. The one or more films or the overlayer as a whole may comprise or consist of material with functionally graded mechanical properties.

In some embodiments, a hard overlayer may be achieved or applied as per one of the above discussed methods (e.g., UV, plasma, PVD, CVD, ink dip and cure, spray coating, etc.) without the optical fiber being strained. In these embodiments, the overlayer is configured to expand after it has formed (e.g., hardened or cured) or the core is contracted after the overlayer is formed, allowing the same force interactions discussed above to produce wrinkles. In these embodiments, the strain step 62 shown in FIG. 6 can simply be omitted.

Figures 7, 8:
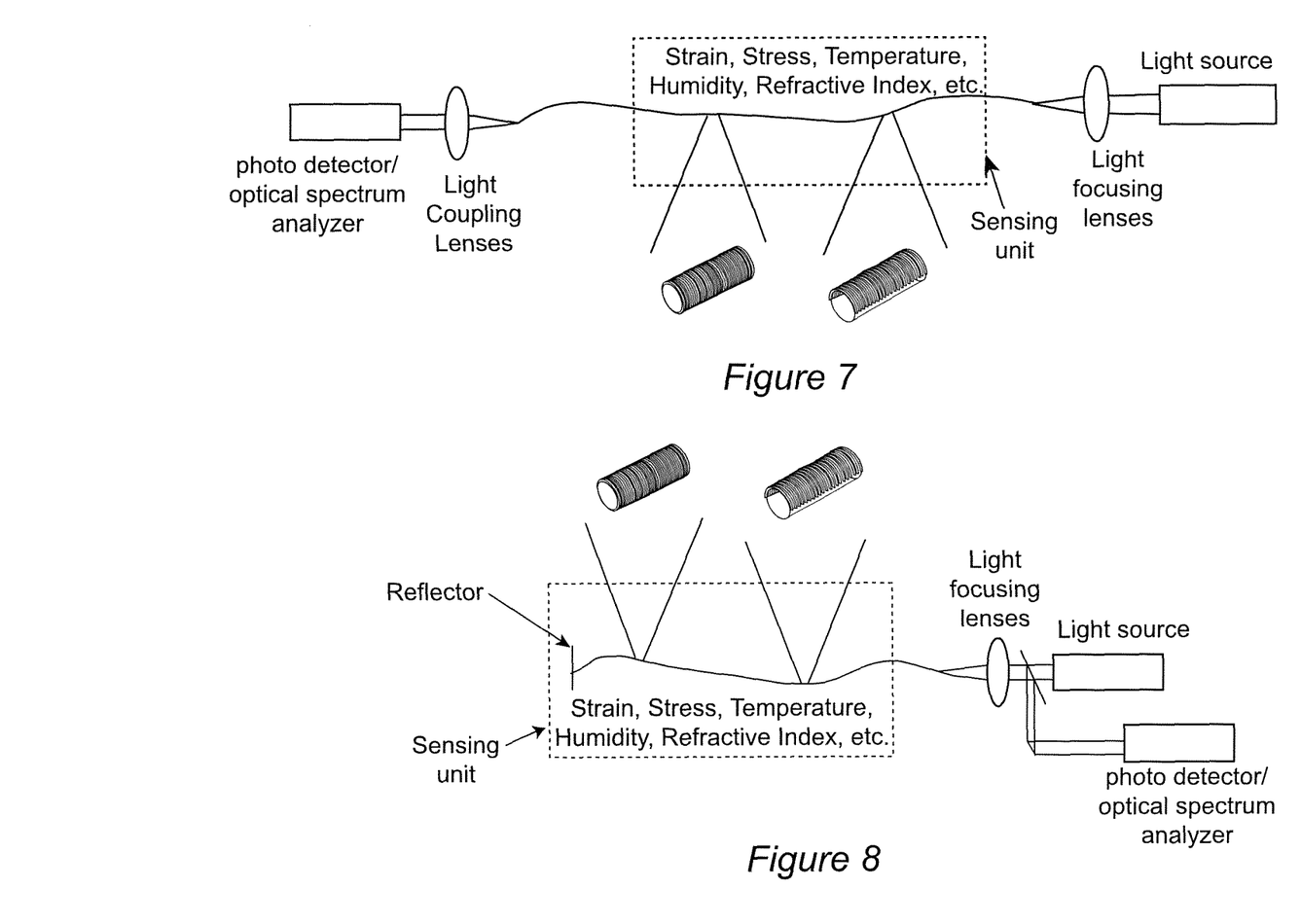
FIG. 7 illustrates a transmissive measurement methodology using the invention.
FIG. 8 illustrates a reflective measurement methodology using the invention allowing measurements to be made from only one end of the optical fiber.

Referring now to FIGS. 7 and 8, a measurement can be made by the fiber grating device in accordance with the invention by either transmissive methods, reflective methods or a combination of the two, whether or not in combination with other fiber optic measurement techniques, as alluded to above. As shown in FIG. 7, light is coupled into a fiber optic cable with a schematically illustrated focusing lens arrangement, the particulars of which are not important to the practice of the invention, the light is transmitted through the cable and scattered to some degree by the fiber grating device in accordance with the invention as described above depending on the amount of strain placed thereon by the parameter being measured. The light reaching the other end of the optical fiber is collected by a light-coupling lens arrangement and applied to a photodetector or spectrum analyzer which produces a signal corresponding to the measured parameter for which the grating can be calibrated either individually or statistically, depending on the measurement accuracy required. The reflective method illustrated in FIG. 8 is similar but differs by the inclusion of a reflector or refractor at the end of the fiber optic cable and use of a directional coupler or similar structure at the input end of the optical fiber to separate the returned light to a photodetector or spectrum analyzer (and/or additional instrumentation). Reflective methods are generally preferred for measurements based on interference effects.

Figure 9:
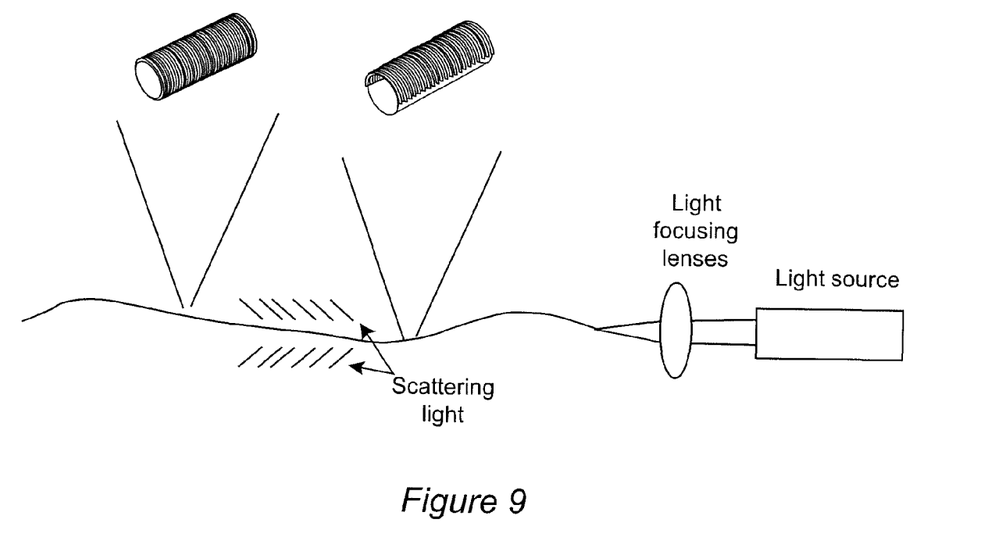
FIG. 9 illustrates use of an optical fiber in accordance with the invention as a fiber waveguide.

In addition, long period fiber grating devices in accordance with the invention can be used as a waveguide as illustrated in FIG. 9. The PDMS material and other suitable materials discussed above exhibit good biocompatibility, good chemical and temperature resistance, low cost and high flexibility. Thus, fiber grating devices in accordance with the invention can be utilized to scatter light, possibly in a selectively controllable manner by application of stress for such purposes as general illumination, biosensing, photo therapy, decoration, entertainment and the like. As an example, in a photo therapy application, a fiber can be passed into a human body with a fiber grating portion located within and/or adjacent a tumor. Laser light passed into the fiber will be safely contained within the fiber until it reaches the wrinkles/undulated surface of the fiber grating. At the grating the laser light is scattered into the tumor tissue. Accordingly, only the tumor sight is irradiated with the laser light. A partial fiber grating formed on only part of the circumference of the optical fiber, as described above, may be useful in obtaining direction irradiation in some photo therapy applications.

Figure 10:
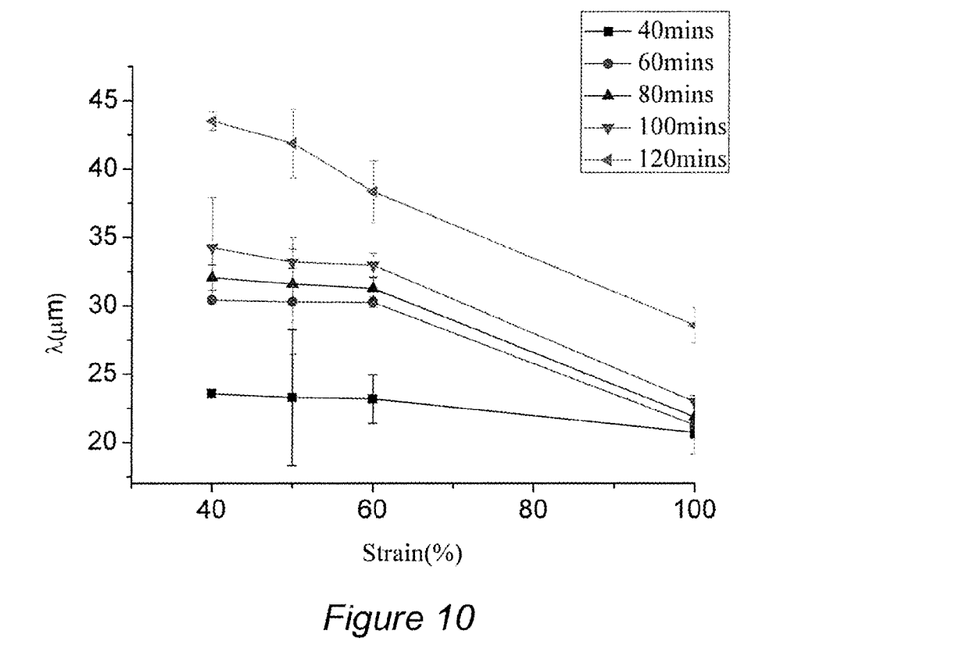
FIG. 10 is a graph of the relationship between pre-strain ratio (%) and the wavelength of the wrinkles (μm) for the case when fibers were rotated during UV exposure.
Figure 11:
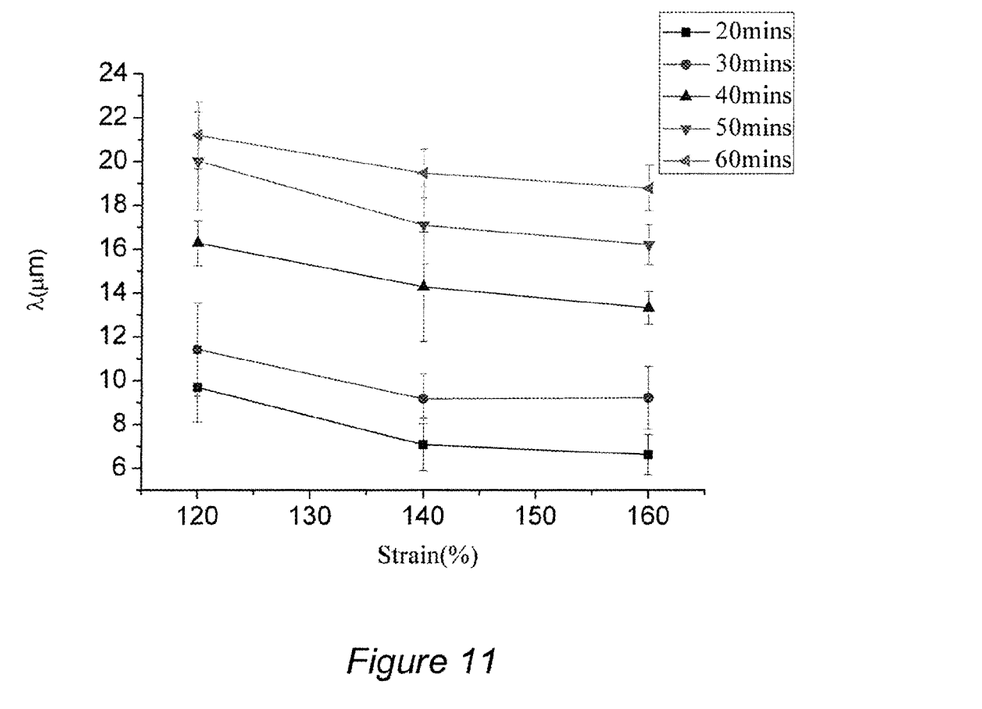
FIG. 11 is a graph of the relationship between pre-strain ratio (%) and the wavelength of the wrinkles (μm) for the case when fibers were not rotated during UV exposure.
Figure 12:
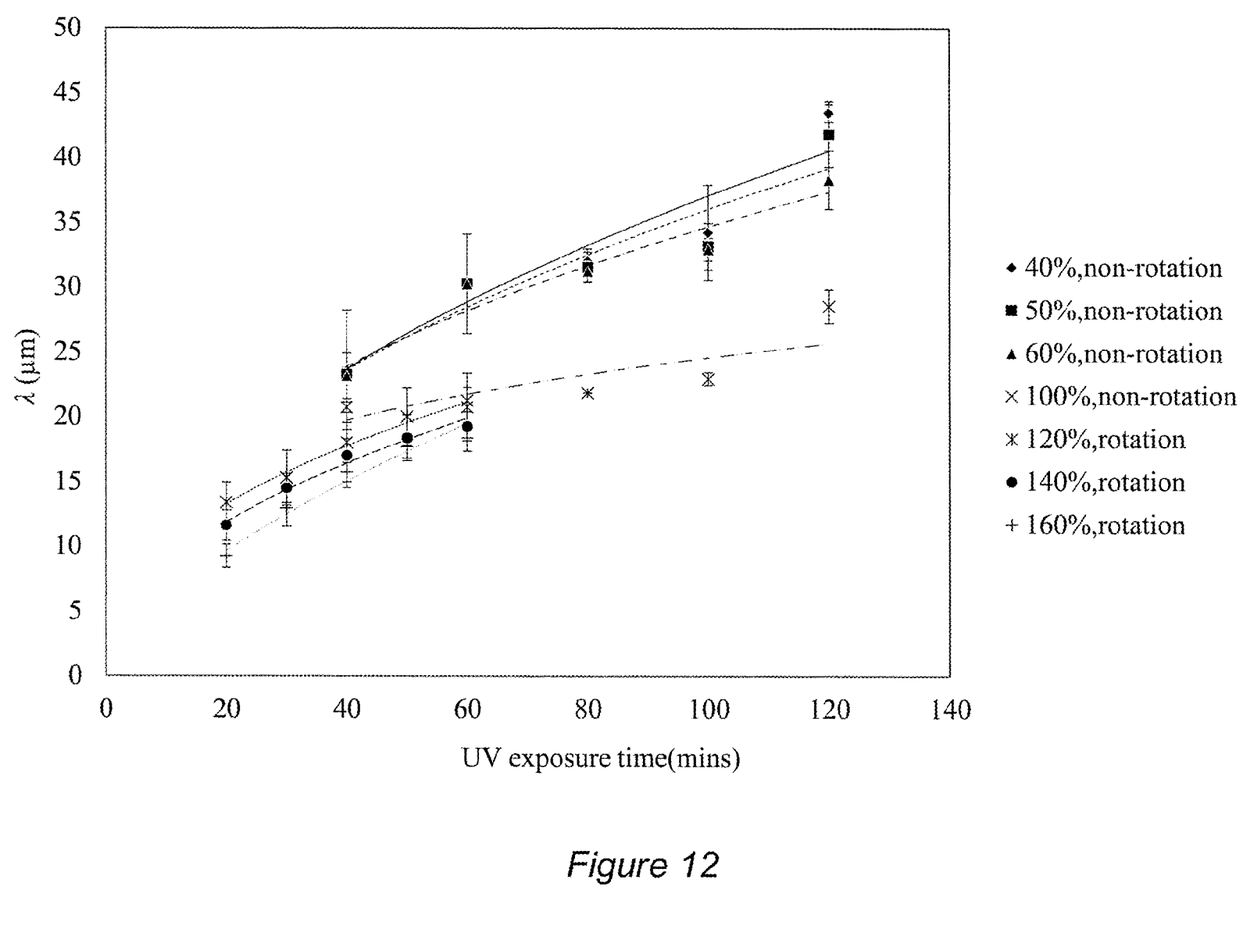
FIG. 12 is a graph of wrinkle wavelength as a function of UV exposure time for a 0.4 mm diameter PDMS fiber at different pre-stretch levels.

In view of the foregoing, it is clearly seen that the invention provides a fiber optic grating having a unique structure including circular axisymmetric ripples formed on the surface of a low modulus, highly extensible and flexible material optical fiber and which, when calibrated in the same manner as conventional Bragg gratings, can provide measurements of comparable accuracy while the ripple structure can be formed far less expensively and of a wide variety of materials which allow a greater measurement range and variety of application than conventional Bragg gratings. The height and periodicity of the wrinkles can be modified or controlled more or less closely by choice of materials and their mechanical properties and numerous other parameters, permitting high flexibility in design. For example, FIGS. 10 and 11 demonstrate how the relationship of pre-strain ratio (%) to wrinkle wavelength (µm) is configurable depending on such factors as duration of UV exposure and fiber rotation during UV exposure. FIG. 12 demonstrates how wrinkle wavelength is adjustable and configurable based on factors such as UV exposure time and pre-stretch level. The expanded range of applications is further extended by the ability to form gratings and fiber grating devices of arbitrary length without commensurately increased cost of manufacture.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method of forming a fiber optic device, said method comprising the steps of:
    applying an axial force to at least a portion of an elastically deformable fiber optic core of an optical fiber to produce an elongation,
    forming or applying a hard shell or overlayer on said at least a portion of an elastically deformable fiber optic core of an optical fiber,
    said elastically deformable fiber optic core having a low modulus of elasticity and capable of withstanding a strain elongation of 200% or more;
    said hard shell or overlayer having a modulus of elasticity at least twice the modulus of elasticity of the core and having finite axial buckling force threshold within the level of stress to achieve 200% elongation of the core; and
    permitting contraction of the elastically deformable fiber optic core to form wrinkles at an interface of said fiber optic core and said hard shell or cladding, wherein the wrinkles are configured to function as a grating;
    wherein the elastically deformable fiber optic core and the hard shell or overlayer encasing said elastically deformable fiber optic core are configured to elongate when subjected to a longitudinal stress; and
    wherein spectral effects and interference patterns change with height and periodicity of the undulations or wrinkles, longitudinal stress causing elongation of the elastically deformable fiber optic core cause the undulations or wrinkles to be diminished in height and increased in separation, thus changing both the degree of scattering and effects on the spectrum of the light transmitted through the fiber optic core.

2. The method as recited in claim 1, including the further step of irradiating said elastically deformable fiber optic core using ultraviolet light or a plasma to form said hard shell or overlayer from material of said elastically deformable fiber optic core.

3. An optical device, comprising:

an elastically deformable fiber optic core;

a hard shell or overlayer encasing said elastically deformable fiber optic core, said hard shell or overlayer having a thickness approaching one half or less of an unstressed diameter of the core, the hard shell or overlayer having undulations or wrinkles substantially uniform in both height and period along at least a portion of the fiber optic core length, the undulations or wrinkles forming a Brag diffraction grating;

said elastically deformable fiber optic core having a low modulus of elasticity and capable of withstanding a strain elongation of 200% or more;

said hard shell or overlayer having a modulus of elasticity at least twice the modulus of elasticity of the core and having finite axial buckling force threshold within the level of stress to achieve 200% elongation of the core;

wherein the elastically deformable fiber optic core and the hard shell or overlayer encasing said elastically deformable fiber optic core are configured to elongate when subjected to a longitudinal stress; and wherein spectral effects and interference patterns change with height and periodicity of the undulations or wrinkles, longitudinal stress causing elongation of the elastically deformable fiber optic core cause the undulations or wrinkles to be diminished in height and increased in separation, thus changing both the degree of scattering and effects on the spectrum of the light transmitted through the fiber optic core.

4. The fiber optic device as recited in claim 3, wherein the wrinkles of said hard skin or cladding are configured to function as a Bragg grating which varies with elongation of the elastically deformable fiber optic core and the hard shell or overlayer encasing when subjected to a longitudinal stress.

5. The optical device of claim 3, further comprising:

a light source configured for transmitting light through said elastically deformable fiber optic core; and an optical detector configured to receive light transmitted through said elastically deformable fiber optic core, wherein a distance traversed by light from the light source to the optical detector varies with elongation of the the elastically deformable fiber optic core and the hard shell or overlayer encasing said elastically deformable fiber optic core elongate when subjected to a longitudinal stress.

6. The optical device of claim 5, wherein said optical detector is configured at one end of the elastically deformable fiber optic core to receive light which passes through the elastically deformable fiber optic core from said light source configured at an opposite end of said elastically deformable fiber optic core.

7. The optical device of claim 5, wherein said optical detector is configured to receive light which passes through the elastically deformable fiber optic core from said light source and which light is reflected back through said elastically deformable fiber optic core.

* * * * *